United States Patent [19]

Jones et al.

[11] 3,963,387

[45] June 15, 1976

[54] ROTARY ENGINE WITH SELF-CENTERING ROTOR GEAR

[75] Inventors: Charles Jones, Hillsdale; George H. Woodier, Ringwood, both of N.J.

[73] Assignee: Curtiss-Wright Corporation, Wood-Ridge, N.J.

[22] Filed: May 1, 1975

[21] Appl. No.: 573,448

[52] U.S. Cl. .................................. 418/61 A; 74/431

[51] Int. Cl.$^2$ ....................... F01C 1/02; F04C 17/02; F16H 55/00

[58] Field of Search .................. 418/61 A; 123/8.01, 123/8.45; 74/431, 433

[56] References Cited

UNITED STATES PATENTS

| | | | |
|---|---|---|---|
| 3,111,261 | 11/1963 | Bentele et al. | 418/61 A |
| 3,168,237 | 2/1965 | Paschke | 418/61 A |
| 3,230,789 | 1/1966 | Jones | 74/431 |
| 3,829,944 | 8/1974 | Wilmers | 418/61 A |

*Primary Examiner*—John J. Vrablik
*Attorney, Agent, or Firm*—Victor D. Behn; Arthur Frederick

[57] ABSTRACT

A composite rotor construction for a rotary engine in which the rotor gear has a self-centering spline connection to a steel sleeve having a tight fit in the rotor bore.

7 Claims, 5 Drawing Figures

ROTARY ENGINE WITH SELF-CENTERING ROTOR GEAR

BACKGROUND OF INVENTION

The invention concerns rotary engines of the type shown in U.S. Pat. No. 2,988,065 and more particularly to rotary engines having a composite rotor construction, for example, as shown in U.S. Pat. No. 3,111,261 and No. 3,230,789. The rotors of such rotary engines are journaled on an eccentric portion of the engine shaft and said rotors have an internal gear connected thereto for meshing engagement with a fixed gear secured to the engine housing. Such rotors are generally made of a suitable aluminum alloy or other light-weight metal having good heat conducting properties. The gear and bearing sleeve for such a rotor are made of stronger material such as steel having lower heat conducting properties and are secured to the rotor hub. Accordingly, because the gear and bearing sleeve run cooler than the rotor since they are located at the rotor hub and because of the relatively lower thermal coefficient of the material of the gear and bearing sleeve, said gear and bearing sleeve will thermally expand and contract relative to the rotor. This differential expansion and contraction makes it difficult to adequately secure and rotatively locate the gear on the rotor.

As shown in aforementioned prior U.S. Pat. No. 3,111,261, the rotor is provided with a steel liner which has a tight shrink fit with the bore of the rotor. In addition, in said patent a combined rotor gear and bearing inner sleeve of steel material has a light interference fit within the steel liner such that this bearing sleeve floats at engine operating temperatures. Also, the inner bearing sleeve with its gear is splined to the rotor to maintain the relative rotative position of the gear on the rotor notwithstanding relative thermal expansion and contraction of the gear and rotor.

With this prior composite rotor construction of U.S. Pat. No. 3,111,261, since the rotor bearing sleeve to which the gear is attached floats radially in the rotor at engine operating temperatures, the splines rotatively locating the gear on the rotor can be subjected to severe stresses and possible fracture as a result of the combustion gas forces on the rotor when an engine working chamber fires. This is so because if the rotor bearing sleeve and gear are radially floating relative to the rotor, then when an engine working chamber fires, the rotor suddenly shifts under the combustion gas forces to take up the bearing clearance between the bearing sleeve and rotor and as a result the rotor suddenly strikes the bearing sleeve thereby possibly severely stressing the splines locating the rotor gear, depending on the circumferential position and clearance of these splines.

With the composite rotor construction of prior U.S. Pat. No. 3,230,789, the rotor has an inner sleeve which has a radial spline connection to the rotor hub to accommodate relative thermal expansion and contraction of the rotor gear which is rigidly attached to this sleeve. Accordingly, in this prior patent the radial spline connection between said inner sleeve and rotor hub transmits the combustion gas forces to the eccentric of the engine shaft on which the rotor is journaled and, therefore, these splines are also subject to severe stresses particularly because of the magnitude of the combustion gas forces. Accordingly, with the construction of U.S. Pat. No. 3,230,789, in order to withstand these forces, the splines have to extend entirely across the rotor, and in addition, the splines have to be accurately mated together, for example, by casting the rotor about the sleeve splines or by extremely accurate machining thereby resulting in a costly construction.

SUMMARY OF INVENTION

It is an object of this invention to provide a novel composite rotor construction for a rotary engine in which the aforementioned prior art problems are avoided or minimized.

It is a further object of the invention to provide a novel composite rotor construction for a rotary engine in which the rotor gear is rotatively located on the rotor by radial lugs or splines to permit relative thermal expansion and contraction of the rotor and gear without the splines being subjected to severe stresses because of combustion gas forces acting on the rotor.

In accordance with the invention the rotor is provided with a sleeve which has a tight fit with the rotor hub and the rotor gear is splined to this sleeve by radial lugs or splines to rotatively locate the gear on the rotor and yet permit relative thermal expansion and contraction of the rotor and gear such that the gear locating lugs or splines are not subject to the combustion gas forces. In addition, a bearing sleeve which floats at engine operating temperatures is received within the first mentioned sleeve to journal the rotor on the shaft eccentric.

Other objects of the invention will become apparent upon reading the annexed detailed description in connection with the drawings.

DESCRIPTION OF PREFERRED EMBODIMENT

Figure 1:
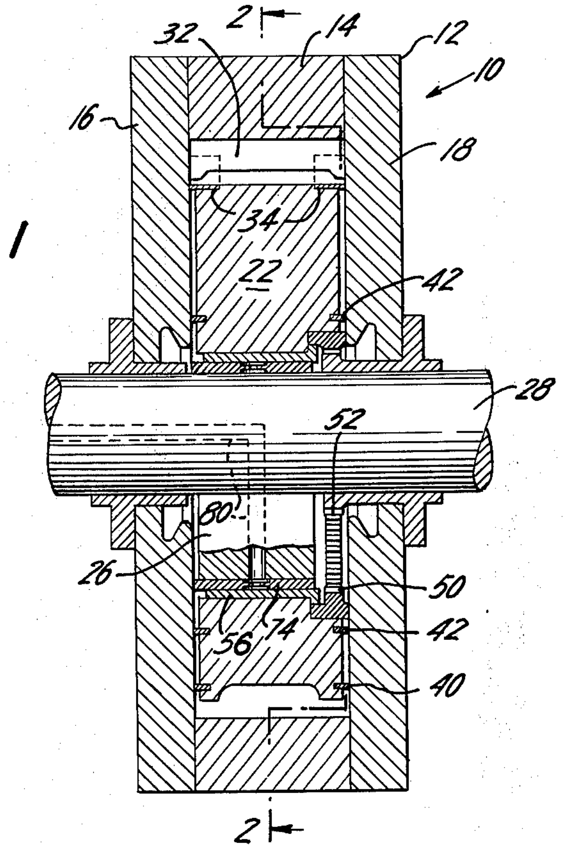
FIG. 1 is an axial sectional view of a rotary engine embodying the invention.
Figure 2:
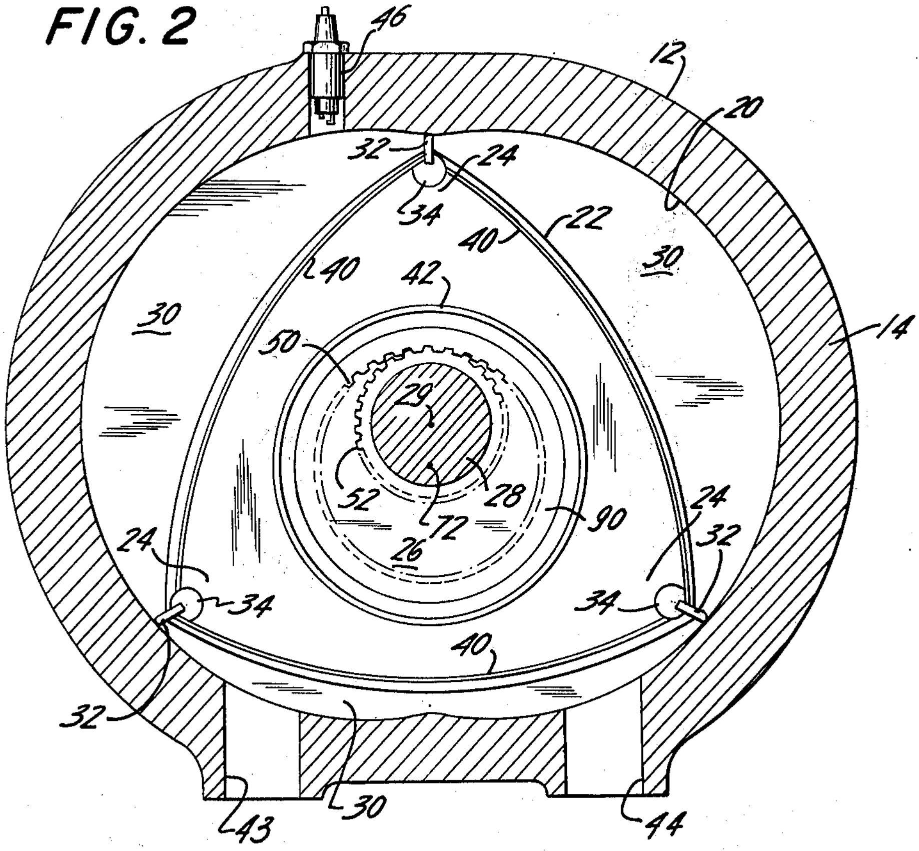
FIG. 2 is a view taken along line 2—2 of FIG. 1.

Referring first to FIGS. 1 and 2 of the drawing, a rotary combustion engine is schematically indicated at 10, the engine being similar to that described in the aforementioned patents. Although the invention is described herein in connection with a rotary combustion engine, it will become apparent that the invention is also applicable to similar rotary mechanisms designed for operation as a compressor or expansion engine.

The engine 10 comprises an outer body or housing 12 consisting of an intermediate or rotor housing 14 and two end or side housings 16 and 18 to form the engine cavity therebetween. The peripheral inner surface 20 of the rotor housing 14, as viewed in FIG. 1, has a multi-lobe profile which preferably is essentially an epitrochoid and, as illustrated, has two lobes.

An inner body or rotor 22 having a plurality of apex portions 24 is disposed within the engine cavity and is journaled on the eccentric portion 26 of a shaft 28 having its axis 29 extending coaxially through the end housings. The apex portions 24 of the rotor 22 have sealing cooperation with the peripheral inner surface 20 of the housing to form a plurality of working chambers 30 between the rotor and said surface. For this purpose each apex portion 24 of the rotor has apex seals 32 extending thereacross in a rotor groove parallel to the rotor axis. In addition, a cylindrical pin 34 is disposed on each end of the rotor apex seal groove and each end face 36 and 38 of the rotor is provided with side seal strips 40 disposed in grooves in their respective rotor end faces and extending between adjacent seal pins 34. In this way the apex seals 32, the seal pins 34 and the side seal strips 40 form a seal grid around each working chamber 30. Each rotor end face is also provided with an annular groove for receiving a seal ring 42 to minimize radially outward flow of lubricating oil along the inner walls of the end housings 16 and 18. Suitable springs (not shown) are disposed behind the seal elements to urge them into contact with the adjacent housing surfaces.

The outer body 12 of the engine is also provided with an intake port 43 and exhaust port 44 disposed on opposite sides of one of the junctions 45 of the two lobe peripheral surface 20 and a spark plug 46 is disposed adjacent the opposite junction of said two lobes.

An internal gear 50 is secured (as hereinafter described) adjacent to one end face of the rotor and a fixed external gear 52 is secured to the adjacent end housing. The gearing 50 and 52 controls the rotation of the rotor relative to the shaft and engine housing.

The construction so far described is conventional and is similar to that shown in the aforementioned patents.

The rotor 22 preferably is generally made of lightweight material such as aluminum or aluminum alloys to reduce the centrifugal forces on the rotor during engine operation. This is particularly important for high speed engine operation. Materials such as aluminum and aluminum alloys have relatively high heat conductivity and high thermal coefficient of expansion thereby introducing a problem of providing a satisfactory bearing between the rotor 22 and shaft eccentric 26. The invention, however, is not limited to rotors made of light-weight material.

Figure 3:
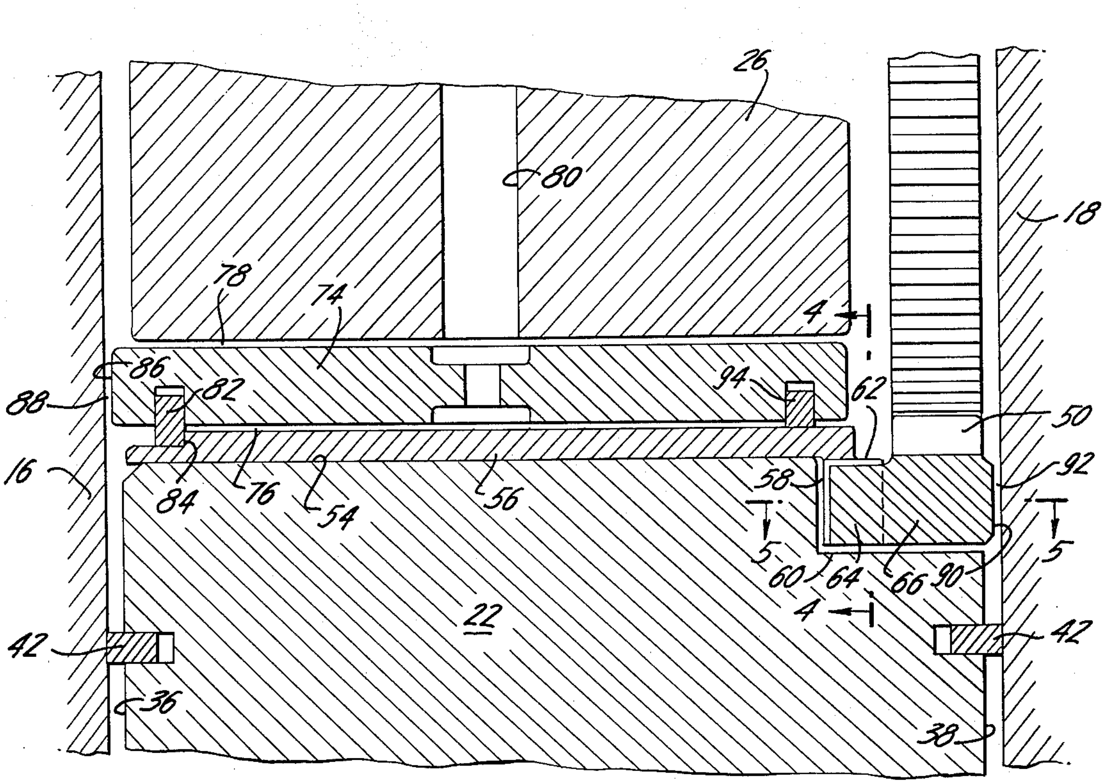
FIG. 3 is an enlarged view of a portion of FIG. 1.
Figure 4:
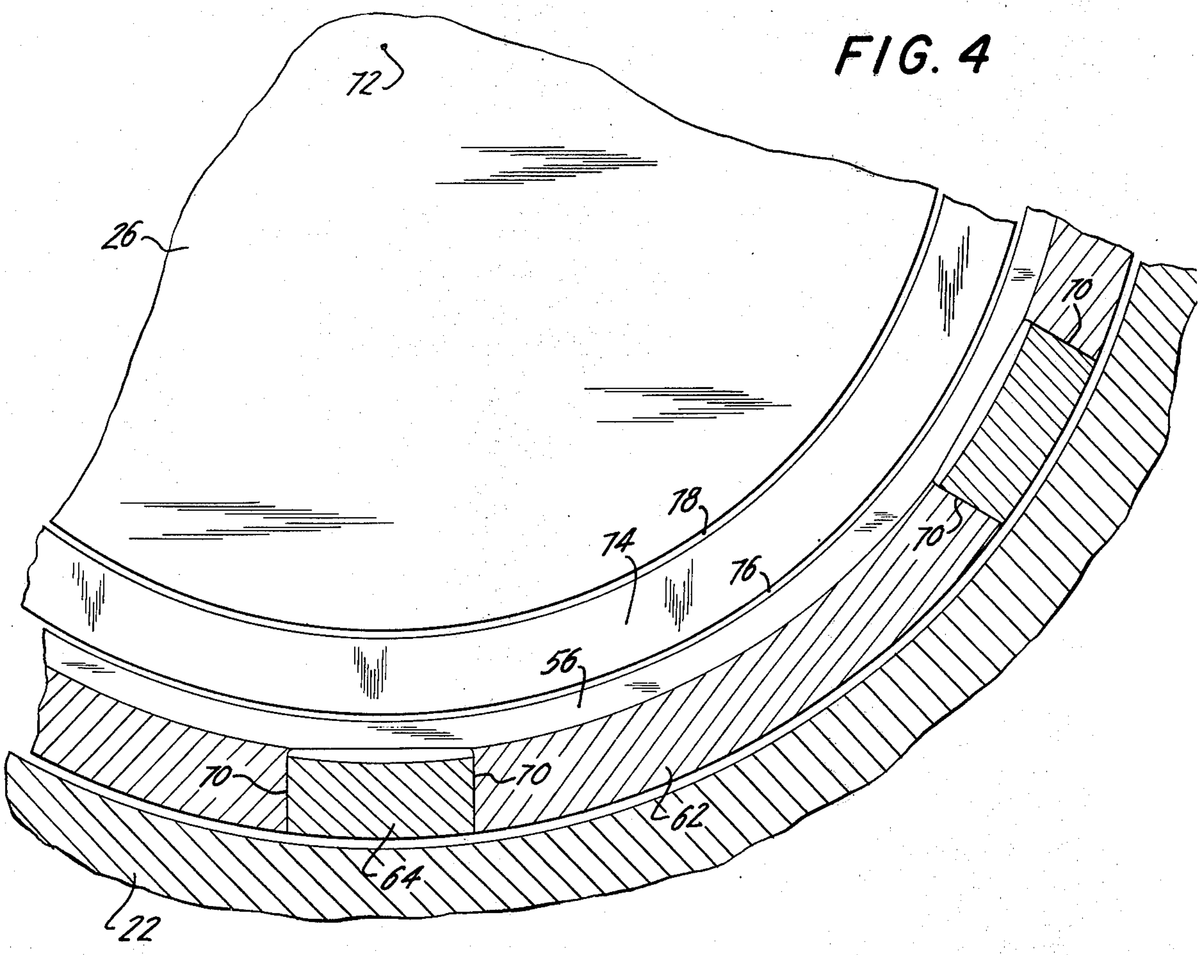
FIG. 4 is a sectional view taken along line 4—4 of FIG. 3.
Figure 5:
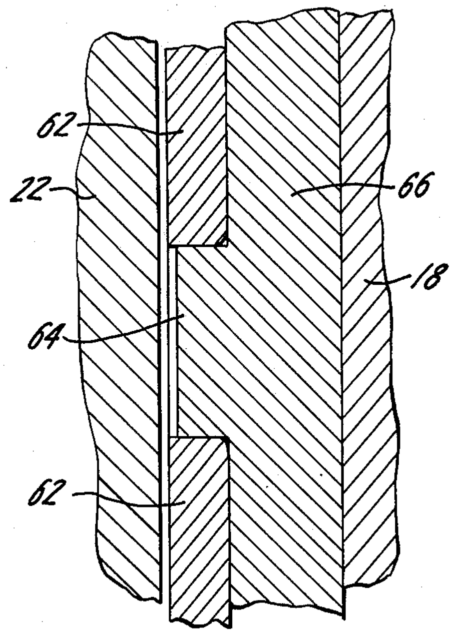
FIG. 5 is a sectional view taken along line 5—5 of FIG. 3.

In accordance with the invention (as is more particularly shown in FIGS. 3–5), the hub or bore 54 of the rotor has a steel sleeve or liner 56 tightly secured thereto preferably by a shrink fit which is sufficiently tight so that the sleeve 56 is tightly fitted to the rotor throughout the operating temperature range of the engine. The steel sleeve 56 has a radial flange 58 at one end extending into an annular notch 60 at the adjacent end face of the rotor 22. The flange 58 is provided with splines or lugs 62 between which are received the splines or lugs 64 formed on the rim or hub 66 of the internal rotor gear 50. As illustrated, the sleeve splines 62 are relatively wide circumferentially as compared to the gear spline 64. Also the engaging side of the splines 62 and 64 are provided with a close fit whereby the rotor gear 50 is accurately located radially relative to the rotor 22. In order to precisely preserve this accurate fit and location during operation of the engine, notwithstanding relative expansion and contraction of the sleeve 56 and gear 50, the engaging sides 70 of the splines 62 and 64 should be radial relative to the axis 72 (FIG. 4) of the rotor 22. However, since the relative expansion and contraction of the steel sleeve 56 and gear 50 (also of steel material) is not large and since the gear splines 64 are of small circumferential width, the sides 70 of the splines 64 engaging the splines 62 can, as illustrated in FIG. 4, be made substantially radial by making the two sides of each spline 64 parallel to a radius midway between said two sides and still provide a precise fit between the splines 62 and 64 notwithstanding relative expansions and contractions of the gear 50 and sleeve 56.

Because of the high thermal coefficient of expansion of the material of the aluminum body of the rotor 22 and because the steel sleeve 56 has a tight interference or shrink fit with said aluminum body portion, the steel sleeve 56 expands and contracts with changes in engine temperature to a greater extent than it would do if the sleeve 56 did not have this tight shrink fit. Accordingly, if the steel sleeve 56 were to function as a plain bearing directly on a shaft eccentric 26, the bearing clearance might become excessive after the engine reached its operating temperature. In order to provide sufficiently small bearing clearance at all engine operating temperatures so as to maintain a bearing oil film between the bearing surfaces, an inner bearing sleeve 74 is disposed between the shaft eccentric 26 and the steel sleeve 56. At engine operating temperatures a bearing clearance 76 is provided between the inner bearing sleeve 74 and steel liner 56 and a bearing clearance 78 is provided between the bearing sleeve 74 and the shaft eccentric 26, these clearances being exaggerated in FIG. 3 for purpose of illustration. Lubricating oil is supplied to both sides of the bearing sleeve 76 from the shaft passage 80.

When the engine is cold, the inner bearing sleeve 74 preferably has an interference or shrink fit with the outer steel sleeve 56, this shrink fit being sufficiently light so that at engine operating temperatures said inner bearing sleeve 74 becomes radially free of the outer sleeve 56 as a result of the substantially greater thermal expansion of the outer sleeve 56, particularly because of the tight shrink fit between the sleeve 56 and rotor 22. For example, the shrink fit between the inner bearing sleeve and outer sleeve 56 may be sufficiently light so that the bearing sleeve 74 becomes free of the sleeve 56 when the sleeve temperature reaches 160°F. Thus, at engine operating temperatures the inner bearing sleeve 74 becomes a full floating bearing, both radially and axially. The clearances 76 and 78 may be similar to the corresponding clearances provided for the inner bearing sleeve of aforementioned U.S. Pat. No. 3,111,261.

A snap ring 82 is received within an external groove on the inner sleeve 74, this ring being engageable with a shoulder 84 on the steel or outer sleeve 56 to limit axial motion of the inner sleeve toward the gear side of the rotor 22. As shown in FIG. 3, the dimensions of the inner sleeve 74 are such that with the ring 82 engaging the shoulder 84, the end face 86 of the sleeve 74 protrudes a slight axial distance beyond the adjacent end face 36 of the rotor 22 to leave only a small axial clearance 88 between the sleeve 74 and the end housing 16. Likewise, the rim 66 of the gear 50 is dimensioned so that with its spline 64 disposed completely in mesh with the spline 62 of the sleeve 56, its axial end face 90 protrudes axially slightly beyond the adjacent end face 38 of the rotor 22 to leave only a small axial clearance 92 between the gear rim 66 and the end housing 18. In this way the end faces 86 and 90 of the sleeve 74 and gear rim 66 respectively function to locate the rotor 22 between the end housings 18 and 16.

Since the end faces 86 and 90 are disposed inwardly of the oil seal ring 42, these faces are well lubricated and therefore function as axial thrust bearing faces between the rotor 22 and end housings 18 and 16 in a manner similar to the special rotor hub portions provided in U.S. Pat. No. 3,261,542. (See rotor hub portions 65 of this latter patent). Thus, with the present invention these rotor thrust bearing surfaces are provided by the rotor gear face 90 and the end face 86 of the inner bearing sleeve 74 and, therefore, it is not necessary to fabricate the rotor with special hub portions as in said U.S. Pat. No. 3,261,542 in order to provide said rotor thrust bearing surfaces.

A seal ring 94 preferably is provided at the end of the bearing sleeve 74 remote from the ring 82 so that the rings 82 and 94 serve to minimize oil leakage from the ends of the bearing clearance 76. The bearing clearance 78 preferably is left open at its ends to provide for cooling oil flow through this clearance.

The composite rotor construction of the present invention has numerous advantages over the aforementioned prior art patents having composite rotor constructions. Thus, with the present invention the floating action of the inner bearing sleeve 74 does not result in the imposition of combustion gas forces on the gear locating splines 62 and 64. Also, the rotor sleeves 56 and 74 and gear 50 are relatively easy to fabricate and can be replaced individually. Furthermore, the gear locating splines 62 and 64 do not interfere with the floating action either axially or radially of the bearing sleeve 74. In addition, the splines 62 and 64 do not require any circumferential clearance as in Pat. No. 3,111,261 to avoid interference with the bearing floating action whereby the present invention provides a more precise rotative location of the rotor. Finally, the rotor gear locating splines 64 mesh with splines 62 on a steel sleeve 56 rather than with splines on the aluminum main body of the rotor as in U.S. Pat. No. 3,111,261 and No. 3,230,789 thereby providing a substantially stronger spline construction.

The invention has been described in connection with a rotary combustion engine. It should be apparent that the invention is also applicable to other types of rotary engines as well as to rotary mechanisms designed for use as fluid compressor or expansion engines. Also, it should be understood that this invention is not limited to the specific details of construction and arrangement thereof herein illustrated and that changes and modifications may occur to one skilled in the art without departing from the spirit or scope of the invention.

What is claimed is:

1. A composite rotor for use in a rotary mechanism including an outer housing having a pair of axially spaced end walls and a peripheral wall interconnecting said end walls to form a cavity therebetween and a shaft co-axial with said cavity and having an eccentric portion disposed within said cavity and upon which said rotor is to be journaled for relative rotation and for cooperation with the inner multi-lobe surface of said peripheral wall to form a plurality of working chambers between the rotor and said peripheral wall surface, said composite rotor comprising:

a. a main outer body portion having a bore extending co-axially therethrough, b. a sleeve disposed within said bore with said sleeve being tightly secured to said rotor at all operating temperatures of said mechanism, c. a gear co-axial with and disposed adjacent to one end face of the rotor, and d. said gear and the adjacent end of said sleeve having cooperating splines with substantially radially engaging faces having a close fit for rotatively locating the gear relative to the rotor while at the same time permitting relative thermal expansion and contraction between the sleeve and gear.

2. A composite rotor as claimed in claim 1 and in which said sleeve is secured to the rotor by a shrink fit which is sufficiently tight to maintain said shrink fit at all operating temperatures of said mechanism.

3. A composite rotor as claimed in claim 1 and including an inner sleeve which has a floating radial bearing clearance with said shaft eccentric portion and has a floating radial bearing clearance with the first mentioned sleeve at operating temperatures of the mechanism.

4. A composite rotor as claimed in claim 3 and in which the rim portion of said gear has an end face which protrudes axially slightly beyond the adjacent end face of the rotor outer body portion and the end face of said inner sleeve at its anti-gear end protrudes axially slightly beyond the adjacent end face of the rotor and means for limiting axial motion of said inner sleeve in a direction toward the end face of the rotor adjacent to the gear.

5. A composite rotor as claimed in claim 4 and including an annular oil seal disposed on each rotor end face radially outwardly of the said protruding faces associated with said rotor end face for sealing cooperation with the adjacent end wall of the outer housing and in which the axial clearance between the rotor and the outer housing end walls is a minimum at said protruding faces.

6. A composite rotor as claimed in claim 1 and in which said sleeve is secured to the rotor by a shrink fit which is sufficiently tight to maintain said shrink fit at all operating temperatures of said mechanism and in which said rotor includes an inner bearing sleeve which is disposed within and has a shrink fit with said first mentioned sleeve with this last mentioned shrink fit being sufficiently light so that said inner bearing sleeve has floating radial bearing clearance relative to the other sleeve at operating temperatures of the mechanism.

7. A composite rotor as claimed in claim 6 and in which said rotor outer body portion is of a material having a relatively high thermal coefficient of expansion and with said first mentioned sleeve having a lower thermal coefficient of expansion.

* * * * *